United States Patent
Weald et al.

(10) Patent No.: US 9,912,767 B1
(45) Date of Patent: Mar. 6, 2018

(54) THIRD-PARTY CROSS-SITE DATA SHARING

(71) Applicant: Sharethrough Inc., San Francisco, CA (US)

(72) Inventors: Ryan Weald, San Francisco, CA (US); Michael Jensen, San Francisco, CA (US)

(73) Assignee: Sharethrough Inc., San Francisco, CA (US)

( * ) Notice: Subject to any disclaimer, the term of this patent is extended or adjusted under 35 U.S.C. 154(b) by 310 days.

(21) Appl. No.: 14/144,079

(22) Filed: Dec. 30, 2013

(51) Int. Cl.
*H04L 29/08* (2006.01)
*H04L 29/06* (2006.01)

(52) U.S. Cl.
CPC .............. *H04L 67/22* (2013.01); *H04L 67/10* (2013.01); *H04L 67/12* (2013.01); *H04L 67/16* (2013.01); *H04L 67/24* (2013.01); *H04L 67/28* (2013.01); *H04L 67/42* (2013.01)

(58) Field of Classification Search
CPC ..... H04L 12/5885; H04L 51/32; H04L 67/10; H04L 67/12; H04L 67/16; H04L 67/20; H04L 67/22; H04L 67/24; H04L 67/28; G06Q 30/0251
See application file for complete search history.

(56) References Cited

U.S. PATENT DOCUMENTS

| | | | | |
|---|---|---|---|---|
| 6,763,379 B1* | 7/2004 | Shuster | ................... | H04L 67/24 709/219 |
| 8,060,604 B1* | 11/2011 | Breau | ................... | H04L 65/104 709/224 |
| 2002/0116240 A1* | 8/2002 | Hsuan | ................... | G06Q 30/02 705/26.81 |
| 2002/0165955 A1* | 11/2002 | Johnson | ................... | H04L 67/22 709/224 |
| 2011/0107241 A1* | 5/2011 | Moore | ................ | G06F 17/3089 715/760 |
| 2011/0161362 A1* | 6/2011 | Lipscombe et al. | .......... | 707/769 |
| 2011/0231240 A1* | 9/2011 | Schoen et al. | ............. | 705/14.41 |
| 2012/0166520 A1* | 6/2012 | Lindsay | ................. | G06Q 50/01 709/203 |
| 2013/0073399 A1* | 3/2013 | Celener Nijamkin | ........... | G06Q 30/0241 705/14.73 |
| 2013/0073401 A1* | 3/2013 | Cook | ..................... | G06Q 30/02 705/14.73 |
| 2014/0136693 A1* | 5/2014 | Greifeneder | ............ | H04L 67/10 709/224 |
| 2016/0283460 A1 | 9/2016 | Weald et al. | | |

* cited by examiner

*Primary Examiner* — Ramy M Osman
(74) *Attorney, Agent, or Firm* — Wong & Rees LLP; Karl T. Rees

(57) ABSTRACT

Approaches, techniques, and mechanisms are disclosed for third-party tracking of user data. Instructions provided in association with a first document cause a client at which the first document is viewed to load a second document in a tracking document container associated with the first document. The second document belongs to a third-party domain that is different than a first domain to which the first document belongs. Instructions provided in association with the second document cause the client to retrieve a particular identifier from a local storage area for the third-party domain at the client. The instructions provided in association with the second document further cause the client to send a message to a server comprising the particular identifier.

20 Claims, 6 Drawing Sheets

THIRD-PARTY CROSS-SITE DATA SHARING

TECHNICAL FIELD

Embodiments relate generally to tracking user data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A supplemental item, as used herein, is a data structure that comprises or causes a presentation of information to be shown in coordination with other media content. The other media content may include, without limitation, web pages, electronic publications, and other types of documents. A user will have typically indicated an express intent to view the other media content, such as by opening a document or clicking on a link. In contrast, the supplemental item is typically not expressly requested by the user. An example of a supplemental item is an advertisement, which is a presentation of information intended to persuade an individual to take a particular course of action. Advertisements are often presented within or otherwise in coordination with media content. Other examples of supplemental items include, without limitation, content recommendations, widgets, user-generated comments, and so forth.

A particular category of advertisements described herein is third-party advertisements. Third-party advertisements are produced by a third-party entity (the "advertiser") that is different from the producer or publisher of the media content. The publisher of the media content will often be compensated by the advertiser, or an aggregator that distributes advertisements on behalf of multiple advertisers, for publishing third-party advertisements along with the publisher's own media content. Other types of supplemental items may likewise be distributed by third-party entities.

Some techniques for distributing third-party advertisements and other supplemental items involve content publishers embedding the supplemental items in "iframe" containers. An iframe container, when interpreted by a web browser, causes the web browser to request and display content from a source that is referenced by the iframe container. For example, a third-party distributor of supplemental items may host a web server from which a supplemental item may be retrieved via a source address. A content publisher may "include" this supplemental item in a web page by referencing the source address in an iframe within the web page. Based on cookies and/or session data automatically submitted by the web browser when the web browser requests the contents of the source address from the third-party distributor's web server, the web server may even track distributions of supplemental items to specific users and/or personalize the selection of which supplemental items to return.

Other techniques for distributing third-party advertisements and other supplemental items may not necessarily involve distributing the supplemental items in iframes. For example, one technique involves inserting supplemental items directly within a "feed" of content items within a content publisher's web page using the same look and feel as the content items within the feed. Examples of this and other "native" advertising techniques are described in, for example, U.S. application Ser. No. 14/095,163, entitled "Dynamic Native Advertisement Insertion," by Ryan Weald and Michael Jensen, filed Dec. 3, 2013, the entire contents of which are hereby incorporated by reference for all purposes as if set forth herein. Unfortunately, for these and other supplemental item distribution techniques, it is often not possible to track and/or personalize content for specific users. This is particularly true for some types of web browsers on mobile devices. This is also particularly true in the case of tracking a user's behavior across different web domains, even if the same third-party entity is distributing supplemental items on the different web domains.

For example, if an advertiser that uses the "native advertisement" technique described above is responsible for distributing advertisements on both a first web domain published by a first content provider and a second web domain published by a second content provider, it may not be possible for the advertiser to know whether a device that is visiting the first web domain is the same as a device that has already visited the second web domain. Consequently, the advertiser's effectiveness in placing ads across the multiple domains is impaired. For instance, the advertiser may desire to only show a particular supplemental item only once per user device, but have no reasonable way of ensuring that the particular supplemental item is not inadvertently shown to the user device twice—once on each web domain. Similarly, if a user has requested that the advertiser not show a certain type of advertisement to the user's device on the first web domain, the advertiser may not be able to honor the request at the second web domain because the advertiser would not know when the user's device was visiting the second web domain. Additionally, even aside from distribution of supplemental items, there are a wide variety of other contexts in which conventional third-party tracking and/or personalization techniques are ineffective.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
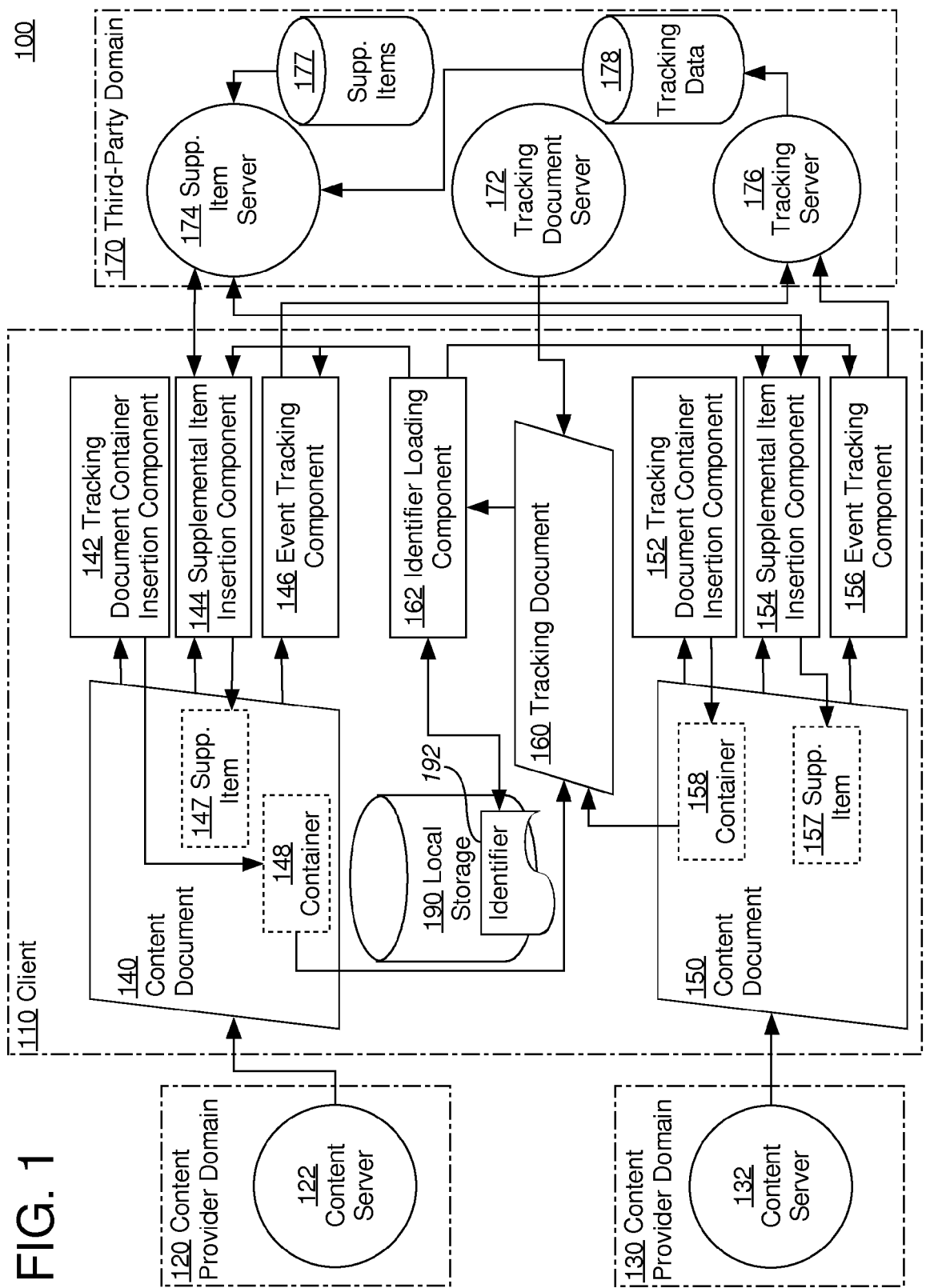
FIG. 1 illustrates an example system 100 in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for third-party tracking of user data. Instructions provided in association with a first document cause a client at which the first document is viewed to load a second document in a tracking document container associated with the first document. The second document belongs to a third-party domain that is different than a first domain to which the first document belongs. Instructions provided in association with the second document cause the client to retrieve a particular identifier from a local storage area for the third-party domain at the client. The instructions provided in association with the second document further cause the client to send a message to a server comprising the particular identifier.

In an embodiment, the server is configured to select a supplemental item to insert in the first document based on the particular identifier. The client receives data describing the supplemental item from the server, and inserts the supplemental item into the first document. In an embodiment, the client further sends, with the message comprising the particular identifier, an indication of one or more events that occurred at the client while displaying the first document. The server is configured to log the one or more events in association with the particular identifier.

According to an embodiment, a third-party may utilize the techniques described herein to determine when a client that has viewed first documents from a first set of one or more domains is viewing a second document from a second domain. Responsive to making such a determination, in an embodiment, a supplemental item may be inserted into the second document based on a log of events that is associated with the client. The events were logged in association with the client's viewing s of the first documents. In an embodiment, responsive to making such a determination, the third-party may also or instead log additional events for the client, the additional events occurring in association with the client's viewing of the second document.

According to an embodiment, a method comprises providing, from a server system executing on a third-party domain, to a client computing device, a tracking document. The tracking document comprises one or more instructions that, when executed by the client computing device, cause the client computing device to: load a client-specific identifier from a data store allocated for the third-party domain; and send the client-specific identifier to the server system in one or more messages indicating one or more events that have occurred in association with a first document. The first document is from a first domain that is different from the third-party domain. The method further comprises receiving, from the client computing device, the client-specific identifier in the one or more messages indicating the one or more events that have occurred with respect to the first document at the client computing device. The method further comprises, responsive to the one or more messages, storing tracking information reflecting that the one or more events occurred in association with the client-specific identifier.

In an embodiment, the first document comprises a tracking document container that instructs the client computing device to load the tracking document from the server system. In an embodiment, the method further comprises providing, to the client computing device, one or more instructions that cause the client computing device to insert the tracking document container into the first document. In an embodiment, the tracking document container is hidden within the first document.

In an embodiment, the method further comprises receiving a request from the client computing device to select an item of supplemental content for display at the client computing device, locating the client-specific identifier based on information in the request, and selecting the item of supplemental content based on the tracking information stored in association with the client-specific identifier. In an embodiment, the method further comprises sending to the client computing device one or more instructions that, when executed by the client computing device, cause the client computing device to insert the selected item of supplemental content into the first document. In an embodiment, the one or more messages include the request to select the item of supplemental content, and the tracking information indicates at least which item of supplemental content was selected.

In an embodiment, the one or more instructions, when executed by the client computing device, further cause the client computing device to provide the client-specific identifier from identifier loading instructions associated with the tracking document to event tracking instructions associated with the first document. In an embodiment, the one or more instructions, when executed by the client computing device, further cause the client computing device to listen for event tracking messages provided by event tracking instructions associated with the first document, and, responsive to the event tracking messages, send the one or more messages with the client-specific identifier to the server system. In an embodiment, the method further comprises providing the event tracking instructions.

In an embodiment, the one or more events include user input at the client computing device selecting a specified element within the first document. In an embodiment, the data store allocated for the third-party domain is inaccessible to the client computing device when executing instructions associated with documents that do not belong to the third-party domain.

In an embodiment, the one or more instructions further cause the client computing device to send the client-specific identifier to the server system in a second set of one or more messages indicating a second set of one or more events that are associated with a second document. The second document is from a second domain that is different from the first domain and the third-party domain. The method further comprises receiving, from the client computing device, the client-specific identifier in the second set of one or more messages indicating that the second set of one or more events have occurred with respect to the second document at the client computing device. The method further comprises, responsive to the second set of one or more messages, updating the tracking information to reflect that the second set of one or more events has occurred in association with the client-specific identifier.

According to an embodiment, a system comprises: content server systems comprising one or more server computing devices configured to provide content documents to client computing devices, the content server systems belonging to two or more different content provider domains; client computing devices configured to display the content documents and execute instructions associated with the content documents, the instructions including one or more instructions to load a tracking document within tracking document containers that have been inserted into the content documents; and a third-party server system belonging to a third-party domain that is different from the two or more content provider domains. The third-party server system comprises one or more server computing devices configured to: receive messages indicating specific events that have occurred with respect to specific documents, of the content documents, at specific clients of the client computing devices. The messages include client-specific identifiers loaded by the client computing devices in response to one or more instructions in the tracking document. The one or more server computing devices are further configured to store, in association with the client-specific identifiers, tracking information reflecting the specific events indicated by the messages.

In an embodiment, the tracking information includes, for a particular client of the client computing devices, a first event log entry reflecting an occurrence of a first event with respect to a first document belonging to a first content provider domain, and a second event log entry reflecting an occurrence of a second event with respect to a second document belonging to a second content provider domain. The first content provider domain is different from the second content provider domain.

In other aspects, the invention encompasses a computer apparatus and a computer-readable medium configured to carry out the foregoing steps.

For convenience, this disclosure describes several examples in which the supplemental items are advertisements. However, the techniques described herein are equally applicable to the insertion of other types of supplemental items into documents and other content.

2.0. Structural Overview

FIG. 1 illustrates an example system 100 in which the techniques described herein may be practiced, according to an embodiment. System 100 comprises at least one client 110 that is communicatively coupled by one or more networks, such as the Internet, to content servers, such as content servers 122 and 132, on two or more different domains, such as content provider domains 120 and 130. Client 110 downloads documents, such as documents 140 and 150, from these content servers. System 100 further comprises various server components, such as server components 172-176, on a third-party domain 170. The downloaded documents contain or have been modified to contain a tracking document container, such as tracking document containers 148 and 158, that references a tracking document 160 from the third-party domain 170. As described below, on account of this fact, the various server components of third-party domain 170 are able to utilize a same identifier 192 to consistently identify the client 110. In this manner, the various server components of third-party domain 170 are able to provide client-specific functionality with respect to documents downloaded to client 110, regardless of from which of the two or more different domains the documents are downloaded.

For convenience, a system of one or more computing devices that respond to requests directed towards one or more domains is referred to herein as a "server" or "server system." In some embodiments, the server system comprises only one server computing device. In other embodiments, the server system may comprise many server computing devices. Moreover, on account of distributed components and/or high availability techniques such as load balancing and clustering, a client interacting with a server system may in fact interact with several different computing devices over the course of that interaction.

2.1. Client

Client 110 is a client computing device, or component thereof, that displays or causes display of documents such as documents 140 and 150. Client 110 may be, for example, a web browser, a document-viewing software application, an operating system, a device that executes the foregoing, or any combination thereof. In an embodiment, documents 140 and 150 are web pages formatted in the Hyper-Text Markup Language ("HTML"). However, the techniques described herein are applicable to other types of documents as well.

In an embodiment, client 110 is a smartphone, tablet, or other mobile computing device. However, the techniques described herein are equally applicable to clients 110 that are other types of computing devices, such as desktop computers. Client 110 retrieves documents 140 and 150 by sending a request to content servers 122 and 132, respectively, that specifies a document identifier, such as a Uniform Resource Indicator ("URI"), for documents 140/150, or by sending an instruction to content servers 122 and 132 that causes content servers 122 and 132 to generate and return document 140 or 150, respectively.

2.2. Content Provider Servers/Domains

Each of content servers 122 and 132 is a system of one or more server computing devices, including web servers, application servers, and/or database servers, that collectively provide various documents to clients such as client 110. In an embodiment, each content server 122 and 132 may be provided by a different content publisher, each of which is in turn different from the operators or providers of client 110 and third-party domain 170. However, in other embodiments, this need not necessarily be true. Communications between a content server 122/132 and client 110 may take place using any suitable protocols and/or data structures. For example, in an embodiment, communications to content server 122/132 may take place using Hyper-text Transfer Protocol ("HTTP") requests with POST or GET data, while documents may be returned via HTTP response messages.

Each of content servers 122 and 132 is deployed in a different one of domains 120 and 130. In an embodiment, the term domain as used herein may refer to, for example, a web domain within the Domain Name System (DNS). Objects belong to a web domain if they reside at, or were originally retrieved from, one or more server computers that have been assigned to the web domain, or otherwise respond to requests directed to the web domain. A server system is considered to be "assigned to," "belong to," or "deployed within" the domain if an address by which a network interface at the server system receives requests for documents, such as an Internet Protocol ("IP") address, is mapped to the domain by, for instance, a root name server, authoritative name server, or other suitable domain lookup mechanism. A web domain is typically assigned a domain name, which is an identification string comprising a first identifier followed by one or more identifiers for one or more parent-level domains. Examples of domain names include "example.com" or "www.example.com.au."

Depending on the embodiment, a web domain may be a second-level, third-level, or any other suitable level domain. Each web domain may comprise many additional subdomains (lower-level domains) that belong to the web domain. For example, "www.example.com" and "www1.example.com" may be considered subdomains of the "example.com" web domain. In an embodiment, the term domain as used in describing the systems and techniques described herein always refers to a web domain that resides at a same particular level within a domain hierarchy, such as at a second-level. In another embodiment, the term domain always refers to a lowest level web domain. In yet another embodiment, the term domain always refers to a highest level web domain within an autonomous DNS zone, including all subdomains within that DNS zone.

In an embodiment, the term domain, as used herein, may refer to any other suitable type of domain, such as a security domain. For example, a domain may be an application or collection of applications that all trust a common security token for authentication, authorization, or session management.

2.3. Third Party Tracking/Supplemental Item Server

As explained above, system 100 further comprises various components 172-178 within a third-party domain 170 that is different from domains 120 and 130. In an embodiment, third-party domain 170 may be operated solely by a supplemental item distributor, such as a third-party advertising or marketing firm. However, in other embodiments, the third-party domain 170 may be operated by any entity, including a content provider that distributes content documents through domain 120 or 130.

For simplification, this disclosure may at times describe certain actions as being performed by or with respect to a third-party domain. These actions should be understood as being performed by one or more computing devices belonging to or acting on behalf of the third-party domain, such as a server that responds to communications addressed to the third-party domain, or a computing device operating within a network of computing devices that belong to the third-party domain.

Third-party domain 170 includes a tracking server 176. Tracking server 176 receives event messages from clients, such as client 110, indicating the occurrence(s) of one or more events relative to documents being displayed at the clients, such as documents 140 and 150. The event messages may report any event that a client has been configured to track, including without limitation the loading of a document, the insertion of a supplemental item, the selection of a hyperlink or other interface element within the document, and/or other user input such as mouse clicks or movements, key presses, scrolling, and so forth. The event messages may take any suitable form. In an embodiment, the event messages may be HTTP requests triggered by beacon elements, as described in other sections. However, event messages may be communicated in a variety of other formats.

Each event message may indicate event occurrence(s) by including an event type identifier. For example, the URI to which an event message is addressed may correspond to a specific event type. Or, the event message may include data, such as HTTP GET or POST data, that lists each event type that has occurred. Each event message further includes a client identifier that is specific to the client from which the message originated, such as identifier 192. Optionally, an event message may include other data, such as a URI or other suitable identifier for the document in association with which the event(s) occurred, other information about the document, document element(s) that have been clicked or are otherwise involved in the event(s), a number of event occurrences, a timestamp, a duration of time since a corresponding document was requested or received, session identifiers, an Internet Protocol ("IP") address, other client identifiers, geo-location data, and so forth.

In response to these messages, tracking server 176 updates a repository of tracking data 178 to reflect the event occurrence(s). In an embodiment, tracking data 178 may reflect each event occurrence individually, in the form of a new record within a running log of events. In an embodiment, tracking data 178 may also or instead reflect each event occurrence by incrementing a counter record that is uniquely associated with at least the event type and the client-specific identifier. In an embodiment, the log or counter record may furthermore be associated with a document URI, a category of content, a content provider domain, and/or other information. Tracking data 178 may also or instead contain other aggregations and/or statistics concerning the event occurrences indicated in the messages received by tracking server 176.

In an embodiment, tracking data 178 may further associate a client-specific identifier with characteristics, such as a geographic location, an age group, social media data, or other demographic information. These characteristics may be derived from event messages and/or explicitly specified during an account registration or configuration process associated with the client-specific identifier.

Third-party domain 170 further includes a supplemental item server 174. Supplemental item server 174 selects supplemental items, such as supplemental items 147 and 157, from a repository of supplemental items 177, and provides information necessary for clients such as client 110 to display the supplemental items in association with documents such as documents 140 and 150. One example of a suitable supplemental item server 174 is described in "Dynamic Native Advertisement Insertion."

Supplemental item server 174 receives certain requests for supplemental items that include either a client-specific identifier, such as identifier 192, or session data by which a client-specific identifier may be located. Supplemental item server 174 may utilize this client-specific identifier to select a supplemental item that is targeted or specifically recommended for the client identified by the client-specific identifier. To this end, supplemental item server 174 is also coupled to tracking data 178. Supplemental item server 174 is configured to utilize some or all of the tracking data 178 to target supplemental items to a client 110.

For example, each supplemental item described by supplemental item repository 177 may include targeting metadata indicating certain categories or conditions to which a supplemental item is targeted. Tracking data 178 may indicate that a client identified by a certain client-specific identifier has viewed at least a certain number of web pages within a certain category within the last day. In accordance to a rule associated with this fact, the supplemental item server 174 may select a supplemental item that has been targeted to this certain category. Or, supplemental item server 174 may utilize a relevance function to generate a client-specific relevance score for one or more supplemental items in supplemental item repository 177. The relevance function may be based on features or variables derived from the tracking data 178 with respect to the client-specific identifier, such as how frequently the client visits a certain type of website or how recently the client received a certain type of supplemental item. A supplemental item may then be selected, in part, based upon the client-specific relevance score.

In an embodiment, similar principles may be extended to groups of clients of which the client indicated by the client-specific identifier is a part. For example, supplemental items may be targeted to a group of clients that share the same or similar characteristics. Likewise, some or all of the features in a relevance function may be derived from tracking data 178 that pertains to a group of clients that share the same or similar characteristics as the client identified by the client-specific identifier. In so doing, supplemental item server 174 may deliver, for example, a certain supplemental item to one client because it has often been clicked on by users at other clients within a same group as the client.

In an embodiment, supplemental item server 174 further provides instructions that, when executed by a client 110, causes the client 110 to insert supplemental items 147 and 157 within documents 140 and 150, respectively. However, some or all of the supplemental items served by supplemental item server 174 may instead simply be displayed in association with documents displayed at client 110, such as in an advertisement viewing area of a document-viewing application at client 110, or of any other application at client 110. For instance, a number of applications intended for mobile devices include a periodically appearing advertisement banner or "pop-up" display. Supplemental item server 174 may be configured to select which supplemental items appear in such displays.

Third-party domain 170 further includes a tracking document server 172 that provides a tracking document 160 to clients such as client 110. Tracking document server 172 may be the same as, or different from, supplemental item server 174 and/or tracking server 176. Third-party domain 170 may further include other components that deliver instructions, such as JavaScript files, necessary to implement some or all of the client-side components described herein.

Communications between client 110 and the various server components 172-176 of third-party domain 170 may take place using any suitable protocols and/or data structures. For example, in an embodiment, communications to third-party domain 170 may take place using HTTP requests with POST or GET data, while communications from third-party domain 170 may involve HTTP responses having HTML instructions, JavaScript instructions, JavaScript Object Notation ("JSON") data, and/or eXtensible Markup Language ("XML") data.

2.4. Client-Side Components

In additional to displaying documents such as documents 140 and 150, client 110 executes various client-side components that facilitate the third-party tracking and supplemental item insertion processes described herein. These components include a tracking document container insertion component 142, a supplemental item insertion component 144, an event tracking component 146, and an identifier loading component 162.

In an embodiment, components 142-146 are instances of executable processes that are implemented based on a combination of functions, objects, and/or other client-side software instructions that are embedded in document 140 and/or retrieved from various servers in response to instructions embedded in document 140. For instance, some or all of components 142-146 may be implemented by JavaScript code downloaded from tracking document server 172 or content server 122 in response to a "script" tag in document 140. Client-side instructions that implement components 142-146 may be found in a single "<script>" tag or referenced JavaScript file, or in any number of "<script>" tags or referenced JavaScript files. JavaScript files containing suitable client-side instructions that implement components 142-146 may be downloaded directly from a server on third-party domain 170, or from a location on content server 122.

Identifier loading component 162 is likewise an instance of executable processes that are implemented based on a combination of functions, objects, and/or other client-side software instructions. However, the client-side instructions that implement identifier loading component 162 are found in tracking document 160, or in one or more JavaScript files referenced by tracking document 160 and downloaded directly from a server on the third-party domain 170. In an embodiment, client-side instructions for implementing the supplemental item insertion component 144 and/or the event tracking component 146 may also be associated, in whole or in part, with tracking document 160 as opposed to document 140.

Generally, the client-side instructions described herein are "associated" with a particular document. The particular document with which the client-side instructions are associated is the document with respect to which, or in the context of which, the client-side instructions are executed. The client-side instructions furthermore have read and write access via a document object model or other suitable representation of this particular document. Furthermore, the act of processing the associated document resulted in the client processing the client-side instructions. The client-side instructions may have become associated with the particular document using any suitable technique. For example, the client-side instructions may be embedded within the document or embedded within one or more files that are referenced by the document. In HTML, for instance, client-side instructions may take the form of JavaScript code found in one or more "<script>" tags within the document, or in one or more files whose URLs are referenced by a "src" attribute of a "<script>" tag. Client-side instructions may also or instead take the form of code in other suitable languages.

Tracking document container insertion component 146 is configured to insert a tracking document container 148 into document 140. As used herein, the term "tracking document container" may refer to any element of a document that contains a separate document loaded dynamically from a server. In HTML, for instance, the "iFrame" element is typically used, though other elements, including a "frame" element or pop-up window, may also be utilized. Tracking document container insertion component 146 may insert tracking document container 148 using any suitable technique for interacting with document 140, such executing JavaScript insertion functions that interact with a document object model ("DOM") representation of document 140. In an embodiment, however, client 110 may not necessarily comprise a tracking document container insertion component 146. In such an embodiment, tracking document container 148 may already have been embedded within document 140 by the content provider or content server 122.

Tracking document container 148 comprises an instruction, such as a "src" attribute, that causes the client 110 to load a tracking document 160 referenced by the tracking document container 148. The tracking document 160 belongs to third-party domain 170. Client 110 may download tracking document 160 directly from a server on third-party domain 170, such as tracking document server 172, or, if client 110 has downloaded tracking document 160 before, client 110 may load the tracking document 160 from a local cache. In an embodiment, tracking document container 148 is hidden within document 140. For example, tracking document container 148 may be associated with formatting instructions that indicate that tracking document container 148 is not to be displayed, or that tracking document container 148 may be positioned outside of a viewing window for document 140. In other embodiments, tracking document container 148 may remain visible, but rendered in such a manner that it is nearly imperceptible. In yet other embodiments, the tracking document 160 may display an icon or other element provided by the third-party domain 170 or content server 122 that is intended to remain visible in document 140.

In an embodiment, the referenced tracking document 160 is the same for each client. In an embodiment, the referenced tracking document 160 is furthermore the same for each document to which the techniques described herein are applied, regardless of whether the document originates from content server 122 and content server 132. In other embodiments, tracking document server 172 may provide different tracking documents 160 for different types of clients and/or different content servers. In an embodiment, each tracking document container 148/158 may reference a slightly different tracking document 160 hosted by tracking document server 172. For example, a first tracking document 160 may be specifically designed to handle custom event tracking functions associated with document 140, whereas a more generic second tracking document 160 may be designed to handle a more universal set of event tracking functions associated with document 150.

Loading tracking document 160 causes client 110 to execute an identifier loading component 162 that is associated with tracking document 160. Identifier loading component 162 retrieves a client identifier 192 from a record within local storage 190 of client 110. Local storage 190 may be, for example, an HTML web storage area as specified by HTML version 5, a WebSQL database, an IndexedDB database, a file or folder within a file system, one or more client-side cookie(s), or any other suitable storage area at client 110. The identifier 192 may be stored, for instance, in a key-value pair record associated with a key predefined by the third-party domain 170.

Local storage 190 may comprise, in an embodiment, two or more data substructures, such as files, directories, or tables, each of which is allocated specifically for use in association with documents from a different domain. Because identifier loading component 162 is executed within the context of tracking document 160 as opposed to content document 140, identifier loading component 162 has access to the data substructure allocated for the third-party domain 170, whereas a component executed within the context of document 140 might not have access to the data substructure belonging to the third-party domain 170 on certain types of clients.

If no identifier 192 exists, identifier loading component 162 stores a new identifier 192 in local storage 190. The new identifier 192 may be selected so as to be unique, or substantially likely to be unique, from client to client. For example, the new identifier 192 may include or be derived from one or more identifiers of hardware or software components at client 110. The new identifier 192 may be generated by identifier loading component 162, or identifier loading component 162 may send a request to a server at the third-party domain 170 to generate the new identifier 192.

Event tracking component 146 generates and sends event messages to tracking server 176. In an embodiment, event tracking component 146 comprises one or more subcomponents that are called when certain events occur with respect to document 140. For example, event tracking component 146 may, when document 140 is first loaded, register the one or more subcomponents with event handler components of client 110. In JavaScript, for instance, the one or more subcomponents may be functions that are registered with DOM Event objects, such as onload, onclick, or onfocus, or with timers such as setTimeout or setInterval. These event handler components are configured to call the one or more subcomponents when an event associated with the event handler occurs. The one or more subcomponents in turn send an event message to tracking server 176 reporting that an occurrence of the event was triggered or detected. In another embodiment, event tracking component 146 may be capable of directly monitoring for such various events.

A wide variety of events may be tracked by event tracking component 146, including user input selecting or focusing on specific elements within document 140, such as a supplemental item 148. The exact events that are tracked may vary from embodiment to embodiment, or even from document to document, depending on how event tracking component 146 is implemented. For example, the content provider that operates domain 120 may wish to know how long a user takes to scroll through a page, while the content provider operating domain 130 may wish to know whether a viewer ever clicks on a certain element. Accordingly, the instructions that implement event tracking component 146 may be different than those that implement event tracking component 156, in that the event tracking subcomponents are registered with a different set of event handlers capable of detecting different types of events.

Event tracking component 146 may be communicatively coupled to identifier loading component 162 via, for instance, a cross-document messaging API. In this manner, the event tracking component 146 may receive identifier 192 and send the identifier 192 in event messages to tracking server 176. For example, event tracking component 146 may comprise a listener subcomponent that waits for a message from the identifier loading component 162 announcing the identifier 192. In JavaScript, for instance, the listener subcomponent may be an EventListener that receives identifier 192 via a postMessage function call from the identifier loading component 162.

As another example, event tracking component 146 may comprise one or more event detection subcomponents implemented based on instructions found in or otherwise associated with document 140 and one or more event reporting subcomponents implemented based on instructions found in or otherwise associated with tracking document 160. When an event is detected, the one or more event detection components may send messages via the cross-document API to the one or more event reporting subcomponents. The one or more event reporting subcomponents then have direct access to the loaded identifier 192.

Event tracking component 146 may be configured to send the event messages using any suitable mechanism. For instance, event tracking component 146 may create beacon elements to report the event messages, as described in other sections. However, in some embodiments, event tracking component 146 may also or instead be capable of generating and sending the event messages directly, without the use of beacon elements.

Supplemental item insertion component 144 is configured to request a supplemental item 148 from supplemental item server 174 and insert a rendered version of the supplemental item within document 140. In an embodiment, the supplemental item is inserted in such a manner that it appears to be a native content item, as discussed in "Dynamic Native Advertisement Insertion." In other embodiments, the supplemental item 148 is inserted in any suitable manner. In an embodiment, supplemental item insertion component 144 may likewise be communicatively coupled with identifier loading component 162, so as to access identifier 192 and include it in a request for a supplemental item. In other embodiments, however, supplemental item insertion component 144 may simply include session identifying information in a request for supplemental item. Assuming the same session identifying information was previously sent to the server in an event message within the same session, the identifier 192 may be located in the tracking data 178 by looking up the session identifying information.

Client 110, as depicted, also includes a tracking document container insertion component 152, supplemental item insertion component 154, and event tracking component 156.

Components 152-156 are similar to components 142-146, respectively, except that they are configured for tracking and/or element insertion with respect to content document 150 instead of 140. It will be appreciated that each particular document for which the described techniques are enabled may have its own respective tracking document container insertion component 142/152, supplemental item insertion component 144/154, and event tracking component 146/156, instantiated specifically with respect to that particular document.

However, in some embodiments, some or all of components 142-146 may be the same as their respective counterpart components 152-156. For example, in an embodiment, a persistent web-browser plug-in or similar module may automatically insert tracking document containers such as tracking document containers 147 and 157 in some or all documents viewed by the web browser. In an embodiment, a persistent web-browser plug-in may similarly provide the supplemental item insertion component 144/154 or the event tracking component 146/156. In another embodiment, some or all of components 142-146 are implemented based on software instructions downloaded prior to client 110 receiving document 140. In an embodiment, components 142-146 and 152-156 may be hard-coded components in a document-viewing application such as a web browser or word processor, and/or components of a third-party plugin, extension, background process, or other application that interfaces with such a document-viewing application.

2.5. Miscellaneous

While only one client 110 and two content provider domains 120 and 130 are depicted in FIG. 1, a system 100 may in fact comprise any number of clients 110 and any number of content provider domains 120/130. Moreover, system 100 is one example of a system suitable for practicing certain techniques described herein. Other systems may include fewer or additional components in potentially varying arrangements. Moreover, the division of work between the depicted components may vary from embodiment to embodiment.

For example, in an embodiment, there may be multiple third-party domains 170. For instance, tracking server 176 and tracking data 178 may be deployed within a third-party domain 170 that is operated by or on behalf of a tracking service provider, whereas supplemental item server 174 and supplemental item data 177 may be deployed in a different third-party domain 170 that is operated by or on behalf of a supplemental item distributor. The tracking service provider may provide the supplemental item distributor with access to some or all of tracking data 178 for use by the supplemental item server 174. In an embodiment, there may be multiple supplemental item distributors that have access to the same tracking data 178, each operating their own supplemental item servers 174 on different third-party domains 170.

In yet another embodiment, some or all of the content providers may deploy their own supplemental item server 174 and supplemental item repositories 177 within domains 120 and/or 130, which interface with the tracking server 176 or otherwise have access to tracking data 178 collected with respect to third-party domain 170. In yet other embodiments, the techniques described herein may be applied to systems 100 that do not have a client-side supplemental item insertion component 144, but rather make use of tracking data 178 in various server-side processes.

For example, a content provider may deploy a client-side identifier reporting component, such as a JavaScript function, in association with a document 140. The client-side identifier reporting component may interface with the identifier loading component 162 to access the identifier 192. The client-side identifier reporting component may then send the identifier 192 to content server 122 via any suitable means, such as in a beacon element, or in a request for another document. Content server 122 may then look up tracking data associated with the identifier 192 in tracking data 178 via an API provided by the tracking server 176 or the tracking data 178. Content server 122 may then utilize this information to select content or supplemental items to provide the client 110 in future communications to client 110.

In yet other embodiments, the techniques described herein may be utilized for tracking purposes unrelated to supplemental item distribution. For example, a third-party tracking provider may utilize tracking data 178 to provide reporting and/or analysis services to content providers, without deploying a supplemental item server 174 at all.

3.0. Functional Overview

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising a client computing device at which the document is viewed, such as a personal computer or mobile device, and one or more servers, such as a web server, a third-party tracking server, and/or a supplemental item server.

3.1. Personalizing Content

Figure 2:
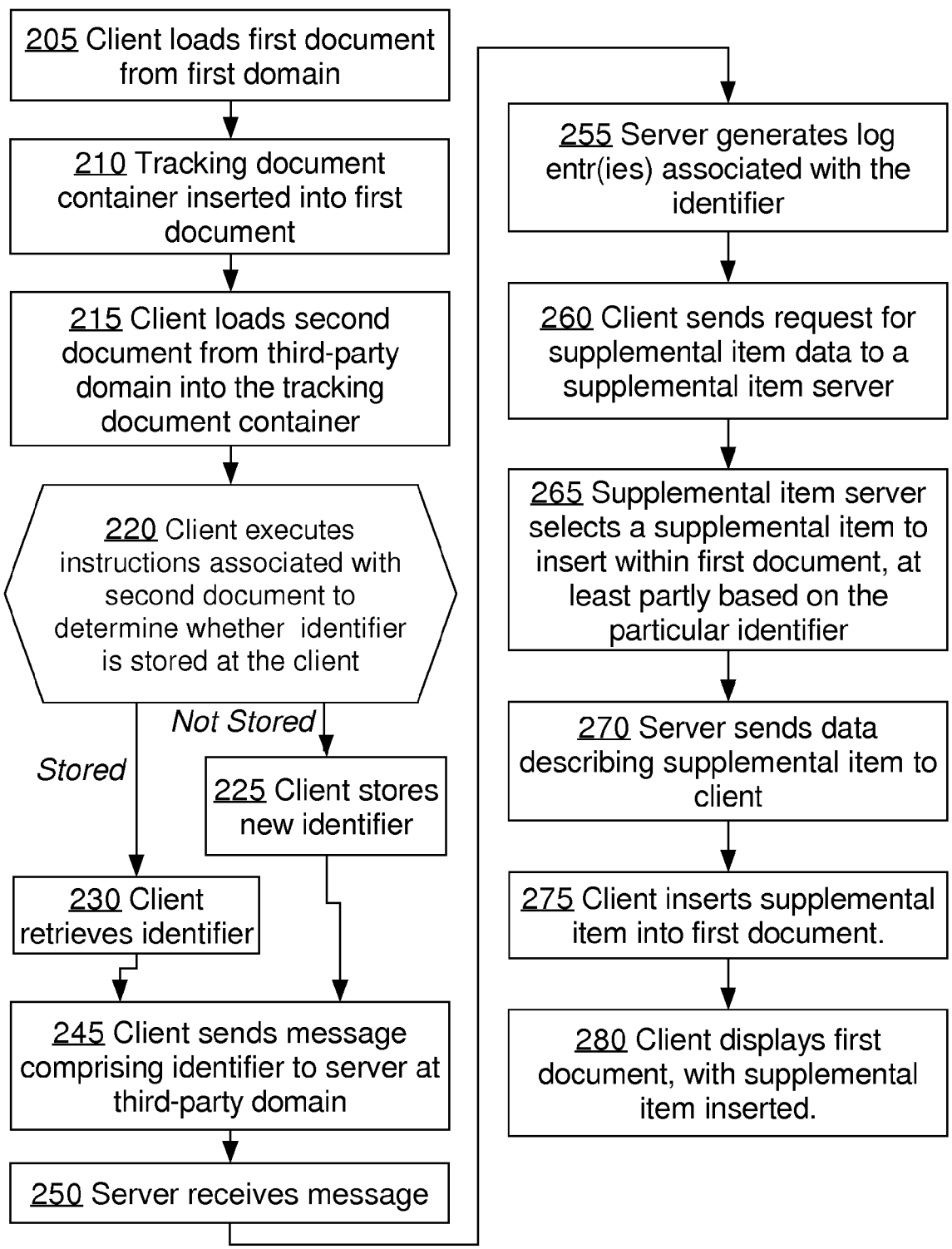
FIG. 2 illustrates an example process flow for selecting content to insert in a document using an identifier associated with a third-party domain.

FIG. 2 illustrates an example process flow 200 for selecting content to insert in a document using an identifier associated with a third-party domain, according to an embodiment. Flow 200 is but one example of a method for utilizing a third-party identifier. Other methods may involve additional or fewer steps in potentially different arrangements.

Block 205 comprises loading, at a client, a first document that belongs to a particular domain. For example, a web browser may send request for a web page addressed to a web server at the particular domain. The web browser may receive, in response to the request, the web page. The web browser may then load the web page into memory. Or, the client may load the first document from a cache, file system, or any other suitable source.

Block 210 comprises inserting a tracking document container into the first document. For example, a hidden iframe element may be inserted at the end of the first document. Any other type of tracking document container may instead be used, whether hidden or visible to the user, and may be inserted at any position relative to other elements within the first document. In an embodiment, the client may add the tracking document container in response to executing instructions found within the first document or otherwise associated with the first document. For instance, such instructions may be found within a script element within the first document, or loaded from a script file that is referenced by the first document. In an embodiment, instructions configured to cause the client to insert the tracking document container are loaded from a JavaScript file that is referenced by a script element that has been embedded or inserted into the first document. The client may retrieve the JavaScript file from the same source as the first document, or from a third-party domain, as described in other sections.

In some embodiments, regardless of from where the client retrieved the instructions configured to cause the client to insert the tracking document container, the instructions are nonetheless provided by a computing device at the third-party domain. For example, a computing device at the first domain may have downloaded the necessary JavaScript file or code block from a computing device at the third-party domain, so that a server at the first domain may provide the JavaScript file or code block in association with the first document. In other embodiments, the instructions need not be provided by a computing device at the third-party domain.

In an embodiment, the insertion occurs before the first document is ever loaded in block 205. For example, a web developer may have included the tracking document container in the first document, or a content management system may have automatically embedded the tracking document container within the first document. As another example, a module at a web server that is serving the first document may have dynamically and automatically added the tracking document container to the first document before sending the first document to the client. In an embodiment, the tracking document container is inserted by a client-side application, such as a browser plugin or extension, other than the application in which the document is viewed.

Block 215 comprises loading, at the client, a second document into the tracking document container. The loading may occur as a result of the client processing a reference to the second document in a source attribute or other suitable attribute of the tracking document container. Or, the loading may occur as a result of the client processing other instructions associated with the document that cause the client to interpret the tracking document container as referencing to the second document. Unlike the first document, the second document belongs to a third-party domain. For example, a web browser may request the second document from a web server whose URL is from the third-party domain instead of the first domain.

Block 220 comprises the client executing instructions associated with the second document to determine whether a particular identifier associated with the third-party domain is stored at the client. For example, the second document may include or reference JavaScript code that, when executed by the web browser, causes the web browser to search in a local storage area at the client for one or more records associated with the third-party domain. If these one or more records do exist, and if these one or more records include a pre-defined variable, key, or field for the particular identifier, then the particular identifier is deemed found. In other embodiments, the particular identifier may be maintained at the client in other forms, and instructions associated with the second document may cause the client to locate the particular identifier using any other suitable technique.

If, in block 220, the particular identifier is not stored at the client, then flow proceeds to block 225. Block 225 comprises storing a particular identifier at the client. In some embodiments, block 225 may further comprise generating the particular identifier using any suitable technique. For example, the instructions associated with the second document may implement an identifier-generating component that generates identifiers based on a function of one or more of: client identifying information, client characteristics, time and date, random number functions, and so forth. In other embodiments, the particular identifier may instead be generated by a server at the third-party domain. The particular identifier may be requested from the server via the instructions associated with the second document, or the server may have pro-actively generated and embedded a suitable particular identifier in the second document or the associated instructions. Flow then proceeds to block 245.

If, in block 220, the particular identifier is stored at the client, then flow proceeds to block 230. Block 230 comprises retrieving the particular identifier. For example, if the particular identifier is associated with a predefined key in the local storage area of the client, then the value of that predefined key is retrieved as the particular identifier. Flow then proceeds to block 245.

Block 245 comprises the client sending a message comprising the particular identifier to a server at the third-party domain, such as a tracking server and/or a supplemental item server. In some embodiments, the client may send the particular identifier by generating and inserting a beacon element, as described in other sections, within the first document or second document. In other embodiments, the client may send the particular identifier in a request for a supplemental item, a supplemental item template, or supplemental item metadata. In yet other embodiments, the client may send the particular identifier using any other suitable communication mechanism.

Depending on the embodiment, block 245 may be performed as a result of executing instructions associated with either or both of the first document and the second document. For example, JavaScript code referenced by the second document may, upon retrieving or generating the particular identifier, generate an image beacon within the first document or the second document. The JavaScript code may instruct the client to build the image beacon in such a manner so as to include the particular identifier in the query string of the URL referenced by the image beacon. As another example, upon retrieving or generating the particular identifier, JavaScript code associated with the second document may instruct the web browser to execute certain JavaScript code associated with the first document. For instance, the JavaScript code associated with the second document may make one or more calls to functions within the first document via a PostMessage API. One of these calls may include the particular identifier as a parameter. The JavaScript code within the first document then sends the particular identifier to the server.

Block 250 comprises the server receiving the message comprising the particular identifier. Again, the particular identifier may be received using any suitable communication technique, such as in a query string of an HTTP GET request, in a cookie, or in HTTP POST data.

Block 255 comprises the server generating one or more log entries associated with the particular identifier. The one or more log entries may reflect the occurrence of any of a variety events indicated by data received in association with the particular identifier. For example, the message received in block 250 may include, in addition to the particular identifier, data that indicates a document identifier and/or a characteristic of the first document. A log entry may thus be generated indicating that the client associated with the particular identifier has visited a document having the document identifier and/or the characteristic indicated by the message.

Log entries may also be generated that reflect the occurrence of specific activities or user input in association with the first document, such as loading a supplemental item into the first document or receiving user input that clicks or otherwise selects an item within the first document. Indicators of such occurrences may also or instead be embedded within the message of block 250. Techniques that more specifically address the tracking of such occurrences are described in other sections of the disclosure.

Block 260 comprises the client sending a request for supplemental item data to a supplemental item server. The request may be simply for supplemental item metadata, for the metadata and a template, for the rendered supplemental item, or for any other data describing the supplemental item. Examples of such a request are described in "Dynamic Native Advertisement Insertion." In an embodiment, the request of block 260 is the message sent by the client in block 245. In another embodiment, the request of block 260 is different than the message of block 245, but includes session data by which the supplemental item server may locate the particular identifier received in block 250.

The supplemental item server may be the same as the server in blocks 245-255, or a different server. While the supplemental item server may also belong to the third-party domain, in other embodiments the supplemental item server may in fact belong to the first domain. In either event, if the supplemental item server is different from the server in blocks 245-255, then the supplemental item server may be configured to communicate with the server to locate the particular identifier using session data associated with the request. The supplemental item server may similarly be configured to request logs associated with the particular identifier, aggregated log data or statistics calculated from events logged in association with the particular identifier, and/or other information derived from events logged in association with the particular identifier.

In an embodiment, the client sends the request of block 260 in response to executing instructions associated with the first document. For example, the first document may include JavaScript code that causes the client to request an insertion script and/or other data from the supplemental item server. In an embodiment, the client instead sends the request of block 260 in response to executing instructions associated with the second document.

Block 265 comprises the supplemental item server selecting a supplemental item to insert within the first document, at least partially based on the particular identifier. The selection may utilize the particular identifier for any of a variety of purposes. For example, a supplemental item may be selected based on it not having been selected for the particular identifier before, or based on the supplemental item having been pre-selected for the particular identifier.

The supplemental item server may also or instead utilize the particular identifier to locate other data, associated with the client, upon which to base the selection of the supplemental item. For example, the supplemental item server may locate data derived from tracking data collected by a tracking server in association with the particular identifier using techniques such as those described herein. Such data may include, without limitation, click-through logs indicating whether supplemental items previously inserted into documents viewed at the client have been "clicked" or otherwise selected by a user at the client, logs indicating documents (as opposed to supplemental items) that have previously been viewed at the client, demographic classifications of the client based on the logs, implicit preferences derived from the logs, and so forth. As another example, the supplemental item server may use the particular identifier to lookup preference data explicitly specified by the client in a registration operation, configuration operation, opt-in interaction, opt-out interaction, or other interaction between the client and the third-party domain. For example, a user may have previously provided demographic information or categorical preferences to the tracking server or the supplemental item server via a suitable web interface.

In an embodiment, using at least the data associated with the particular identifier, the supplemental item server may apply one or more business rules and/or ranking functions to select which supplemental item to provide the client. Any suitable rules or ranking functions may be applied, including functions learned through Bayesian Networks, hidden markov models, neural networks, and so forth. Other considerations for selecting supplemental items may also be utilized, including those described in "Dynamic Native Advertisement Insertion." Additionally, the business rules or ranking functions may utilize data associated with other clients that are determined to be similar to the client based on demographic classifications, preference data, and/or the tracking data.

Optionally, block 265 may further comprise logging the selected supplemental item in association with the particular identifier, so as to keep a history of supplemental items selected for the particular identifier.

Block 270 comprises the supplemental item server sending data describing the supplemental item to the client. The data may include, for example, a rendering of the supplemental item in the format of the first document, or metadata describing the supplemental item. The data may optionally include other information, such as template data and/or insertion instructions, depending on the embodiment.

Block 275 comprises the client inserting the supplemental item into the first document. Although any insertion technique may be utilized, examples of a client inserting a supplemental item within a document are found in "Dynamic Native Advertisement Insertion." The client may perform the insertion by executing insertion instructions associated with the first document and/or received with the supplemental item data. For example, if the request of block 260 was made in response to executing JavaScript code associated with the first document, the client may insert the supplemental item by providing the supplemental item data to one or more JavaScript-based insertion functions associated with the first document. As another example, if the request of block 260 was instead made in response to executing JavaScript code associated with the second document, then the client may provide the supplemental item data as input for one or more JavaScript-based insertion functions associated with the second document, which then interact with certain JavaScript functions associated the first document to insert the supplemental item into the first document.

Block 280 comprises the client displaying the first document, with the inserted supplemental item.

3.2. Event Tracking

Figure 3:
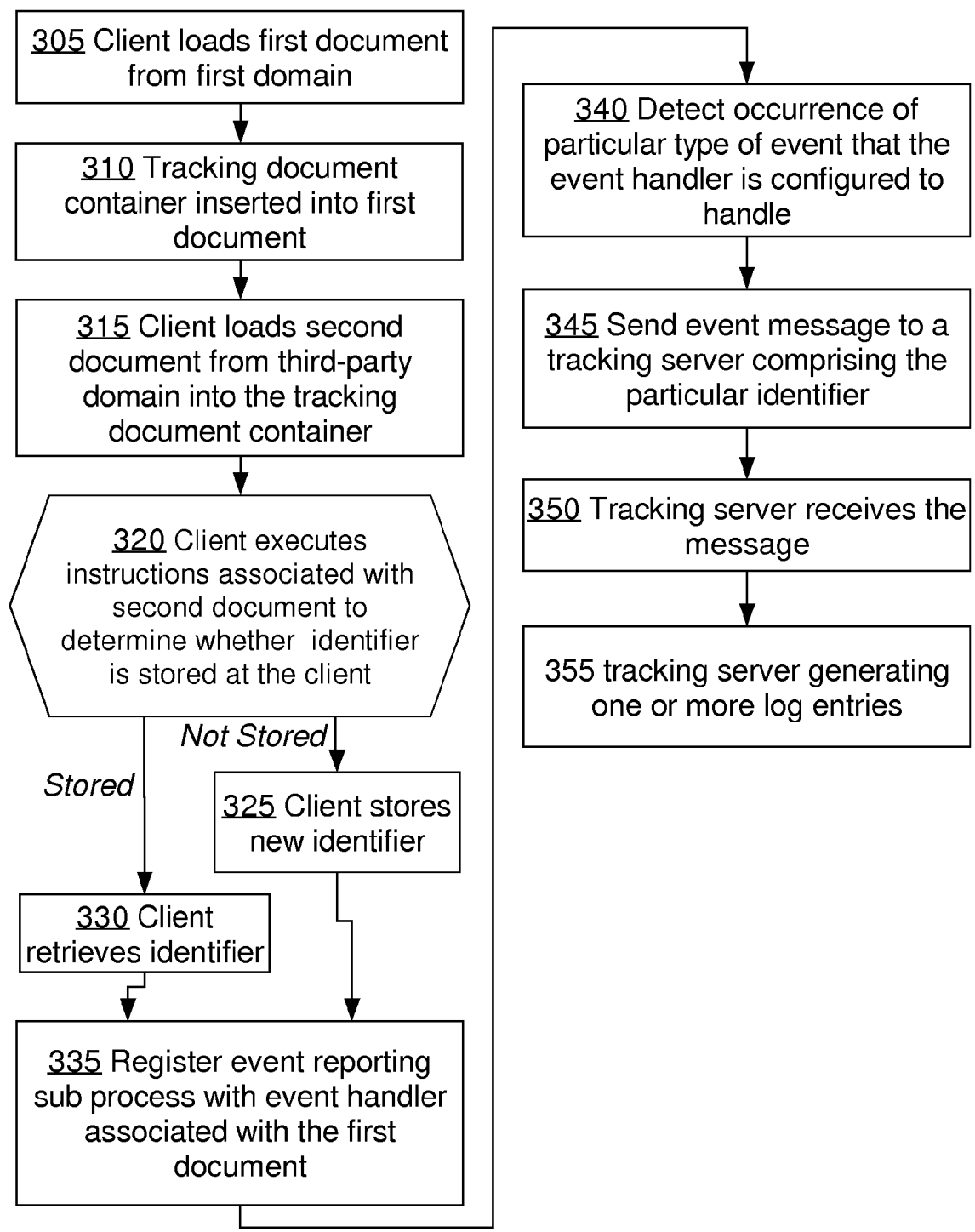
FIG. 3 illustrates an example process flow for tracking events associated with a document based on an identifier associated with a third-party domain.

FIG. 3 illustrates an example process flow 300 for tracking events associated with a document based on an identifier associated with a third-party domain, according to an embodiment. Flow 300 is another example of a method for utilizing a third-party identifier. Yet other methods may involve additional or fewer steps in potentially different arrangements.

Blocks 305-330 are the same as blocks 205-230, respectively.

Block 335 comprises registering an event reporting sub process with an event handler associated with the first document. For example, the first document may be associated with client-side instructions that include an event reporting function for a particular type of event, such as the loading of the first document or a click on a certain element within the first document. The client may provide an event handler object, such as a JavaScript onload or onclick event, that is processed when the particular type of event occurs. A registration instruction that is processed when the first document is loaded may register a "callback" to the event reporting function with this event handler object. In an embodiment, the registration instruction and/or the event reporting function may be included in a same JavaScript file, referenced by the first document, that caused the insertion of the tracking document container. In another embodiment, the registration instruction and/or the event reporting function is included in a separate JavaScript file.

Block 340 comprises detecting an occurrence of a particular type of event that the event handler is configured to handle. For example, the client may receive user input that triggers the occurrence of the particular type of event, such as clicking on a particular element within the document or moving a mouse cursor over the particular element. Or an interval of time associated with a timer may lapse, thus triggering the particular type of event. Any sort of event detection and handling mechanism may be utilized in performance of block 340. Block 342 comprises executing the event reporting function that was registered with the event handler. On account of the registration process of block 335, the event reporting function is called in the course of processing the event handler in block 340. The client then proceeds to execute the event reporting function.

Block 345 comprises, as a consequence of executing the event reporting function, sending an event message to a tracking server comprising the particular identifier from block 320 or block 325. The event message may include any of a variety of information about the event, such as an event type, a timestamp, a name of an element from the first document that is involved in the event, and so forth. The event message may be sent using any suitable communication mechanism, such as by generating a beacon element in the first document or the second document. The tracking server may or may not be on the third-party domain, depending on the embodiment.

In an embodiment, block 345 more specifically comprises the event reporting function sending a cross-document message, such as sent by a JavaScript postMessage call, to an event listener function associated with the second document. The event listener function associated with the second document then accesses the particular identifier, generates the event message, and sends the event message to the tracking server.

In another embodiment, block 345 more specifically comprises executing instructions associated with the first document to receive the particular identifier in a cross-document message from a process implemented by instructions within the second document. The instructions then instruct the client to store the particular identifier in a data structure that is directly accessible to the first document. This may occur at any time relative to the event occurrence, including before the event has ever occurred. Then, when the event reporting function is executed, the event reporting function accesses the particular identifier, generates the event message, and sends the event message to the tracking server.

Block 350 comprises the tracking server receiving the message, in similar manner to block 250 of FIG. 2. Block 355 comprises the tracking server generating one or more log entries, in similar manner to block 255 of FIG. 2.

Some or all of blocks 335-355 may be repeated for any number of event types for which tracking is desired. For example, the client-side instructions associated with the first document may comprise any number of event reporting functions registered with any number of event handlers for the first document. In some embodiments, each event is reported separately, while in other embodiments, some or all of the events may be reported together in a single event message.

3.3. Extensions

In an embodiment, flows 200 and 300 may be performed concurrently with respect to the same first document. Thus, for instance, events associated with a supplemental item that has been inserted into the first document may be recorded and utilized for future selections of supplemental items.

In an embodiment, blocks 205-280 and/or blocks 305-355 are repeated with respect to other documents into which tracking document containers referencing the second document are inserted. These documents may include documents belonging to one or more second domains that are different from both the first domain and the third-party domain. Hence, the same particular identifier from the third-party domain may be used to select supplemental items to insert into both documents belonging to the first domain and documents belonging to other domains apart from the first domain. Similarly, the same particular identifier from the third-party domain may be used to track events associated with both documents belonging to the first domain and documents belonging to other domains apart from the first domain.

For example, a server at the third-party domain may host a single JavaScript file (or other suitable file of instructions) that is referenced by multiple documents from multiple domains. This single file, when executed by a client that downloads these documents, causes the client to insert the same tracking document container, per block 210, in each of the these documents, thus triggering an iteration of flow 200 with respect to each of these documents. If, in a first iteration, the particular identifier is created per block 225, then in future iterations block 230 will retrieve this same particular identifier, even if the future iterations involve documents from domains other than the first domain involved in first iteration.

4.0. Implementation Examples 4.1. Beacon Elements

A "beacon element," which may also be known as a "tracking pixel," is an element in a document whose primary purpose is to cause a client that is processing the element to send information to a server rather than to display information to a viewer of the document. A beacon element causes the client to send information to the server by referencing a URI located on the server. In HTML, for instance, elements such as img elements, iframe elements, style elements, script elements, input link elements, embed elements, object elements, and other elements may be utilized as beacon elements, since they generally include a "src" attribute, "href" attribute, or other attribute that references a URI from which the client is intended to request content for the elements.

In order to render the beacon element, the client will send a request to the server for any content that may be associated with the referenced URI. Typically, the URI will have been selected in such a manner that the client's request to the server will include information of use to the server. For example, the path and/or query string portion of the URI may include information of interest to the server. Additionally, or instead, an HTTP request for the content may inherently include information of interest to the server, such as a cookie, user-agent string, or POST data. In an embodiment, the URI may not necessarily correspond to content at all, but rather be designed solely to communicate information to the server.

In an embodiment, in response to a request triggered by a beacon element, the server may be configured to not respond to the client at all, or the server may be configured to return a "No Content" response. In other embodiments, the server may return a nominal response, such as a very small or empty file. The returned content may be such that it is substantially imperceptible within the document and/or the returned content may be formatted in such a manner that it is hidden from view. In yet other embodiments, the returned content may actually be visible. For example, a beacon element may also serve the purpose of retrieving content that should be displayed within the page.

Many of the beacon elements referred to herein are furthermore inserted into a document dynamically by client-side instructions. For instance, JavaScript features a number of mechanisms that permit insertion of HTML elements into a document, such as by manipulation of a document's innerHTML attribute, or by calling an appendChild function. A beacon element may be inserted into a document at any time relative to the loading of a document. Client-side instructions associated with the document may generate beacon elements designed to report event messages to a server, and then insert those beacon elements if and when the actual events occur. Since the client will process the beacon elements at the time of the insertion, the client-side instruction may thus cause the client to report event messages even after a document has been loaded.

While beacon elements are one way of sending a message to a server, it will also be appreciated that the techniques described herein may instead rely on any other suitable mechanism for sending a message to a server.

4.2. Example Javascript Implementation

Figure 4:
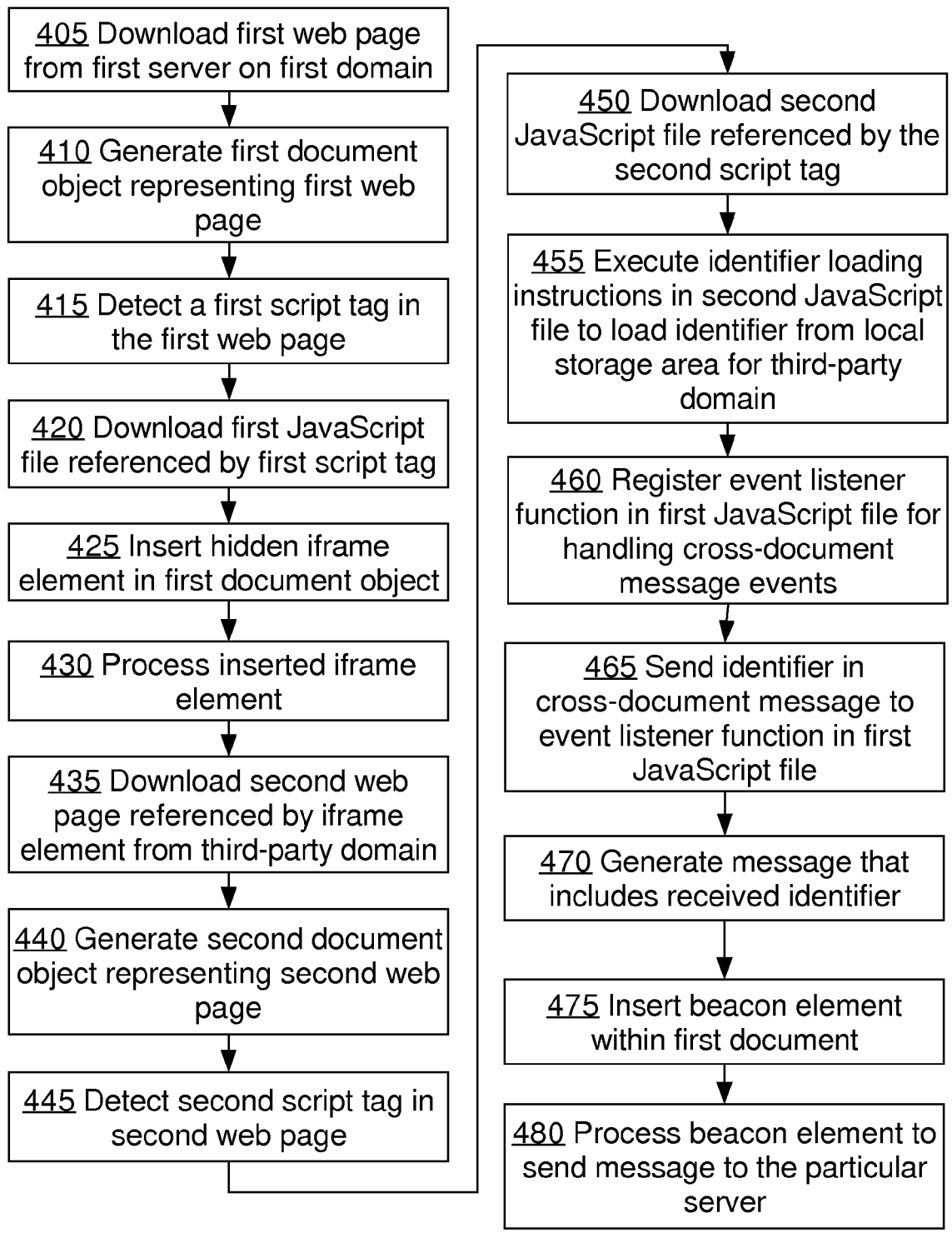
FIG. 4 illustrates an example flow for a JavaScript-specific implementation of the techniques described herein.

FIG. 4 illustrates an example flow 400 for a JavaScript-specific implementation of the techniques described herein, according to an embodiment. Flow 400 is but one example of a JavaScript implementation. Other flows may include fewer or additional elements, in potentially varying arrangements.

Block 405 comprises a browser downloading a first web page from a first server on a first domain. Block 410 comprises the browser rendering the first web page at least partially by generating a first document object representing the first web page. The first document object is a self-contained DOM tree. Block 415 comprises the browser detecting a first script tag in the first web page. Block 420 comprises the browser downloading a first JavaScript file that is referenced by the first script tag. Depending on the embodiment, the first JavaScript file may be downloaded from the first domain or from a third-party domain.

Block 425 comprises the browser executing iframe insertion instructions in the first script to insert a hidden iframe element in the first document object. Block 430 comprises the browser processing the inserted iframe element. Block 435 comprises the browser downloading a second web page referenced by the iframe element from a third-party web server on a third-party domain. Block 440 comprises the browser rendering the second web page in part by generating a second document object representing the second web page.

Block 445 comprises the browser detecting a second script tag in the second web page. Block 450 comprises the browser downloading a second JavaScript file referenced by the second script tag. Block 455 comprises executing identifier loading instructions in the second JavaScript file to load a particular identifier from a HTML local storage area for the third-party domain.

Block 460 comprises executing first registration instructions in the first JavaScript file to register an event listener function in the first JavaScript file for handling cross-document "message" events. Block 465 comprises executing identifier sharing instructions in the second JavaScript file to send the identifier in a cross-document message to the event listener function within the first JavaScript file.

Block 470 comprises executing message generation instructions within the first JavaScript file to generate a message that includes the identifier received in block 465. Block 475 comprises executing a beacon element insertion instruction to insert a beacon element within the first document. Block 480 comprises the browser sending the message to the particular server in an HTTP request responsive to processing the inserted beacon element. The message may be an event reporting message, as described in other sections. Or, the message may be a supplemental item request, as described in other sections. The particular server may be a tracking server, supplemental item server, or a combination thereof.

Figure 5:
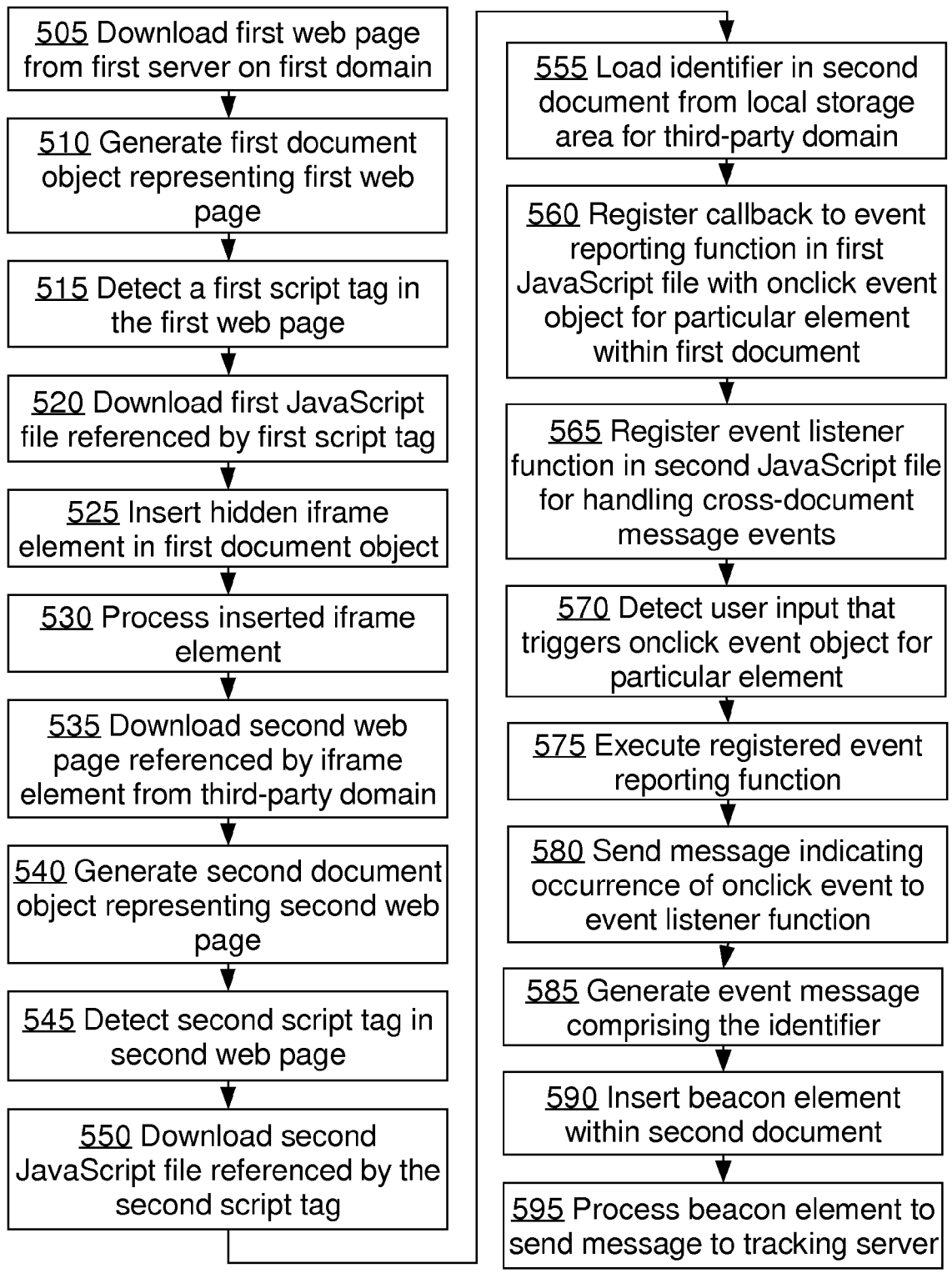
FIG. 5 illustrates another example flow for a JavaScript-specific implementation of the techniques described herein.

FIG. 5 illustrates an example flow 500 for a JavaScript-specific implementation of the techniques described herein, according to an embodiment. Flow 500 is but one example of a JavaScript implementation. Other flows may include fewer or additional elements, in potentially varying arrangements.

Blocks 505-555 are the same as blocks 405-455. Block 560 comprises executing first registration instructions in the first JavaScript file to register a callback to an event reporting function in the first JavaScript file with an "onclick" event object for a particular element within the first document. Block 565 comprises executing second registration instructions in the second JavaScript file to register an event listener function in the second JavaScript file for handling cross-document "message" events.

Block 570 comprises the browser detecting user input that triggers the "onclick" event object for the particular element. Block 575 comprises, responsive to the detecting, executing the event reporting function registered with the "onclick" event object. Block 580 comprises executing a postMessage instruction within the event reporting function of the first JavaScript file to send a cross-document message indicating the occurrence of the "onclick" event to the event listener function in the second JavaScript file.

Block 585 comprises, responsive to the cross-document message, executing message generation instructions in the event listener function to generate an event message, comprising the identifier, to send to a tracking server. Block 590 comprises executing a beacon element insertion instruction to insert a beacon element within the second document. Block 595 comprises the browser sending the message in an HTTP request to the particular server responsive to processing the inserted beacon element.

Other embodiments of the foregoing example JavaScript-based techniques may divide up the various JavaScript instructions amongst more than two JavaScript files. Moreover, other events instead of or in addition to the "onclick" event may be handled by the event reporting function. Multiple beacon elements may be generated for different types of events. Moreover, the JavaScript files may further include supplemental item insertion functions. A number of other variations are also possible.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
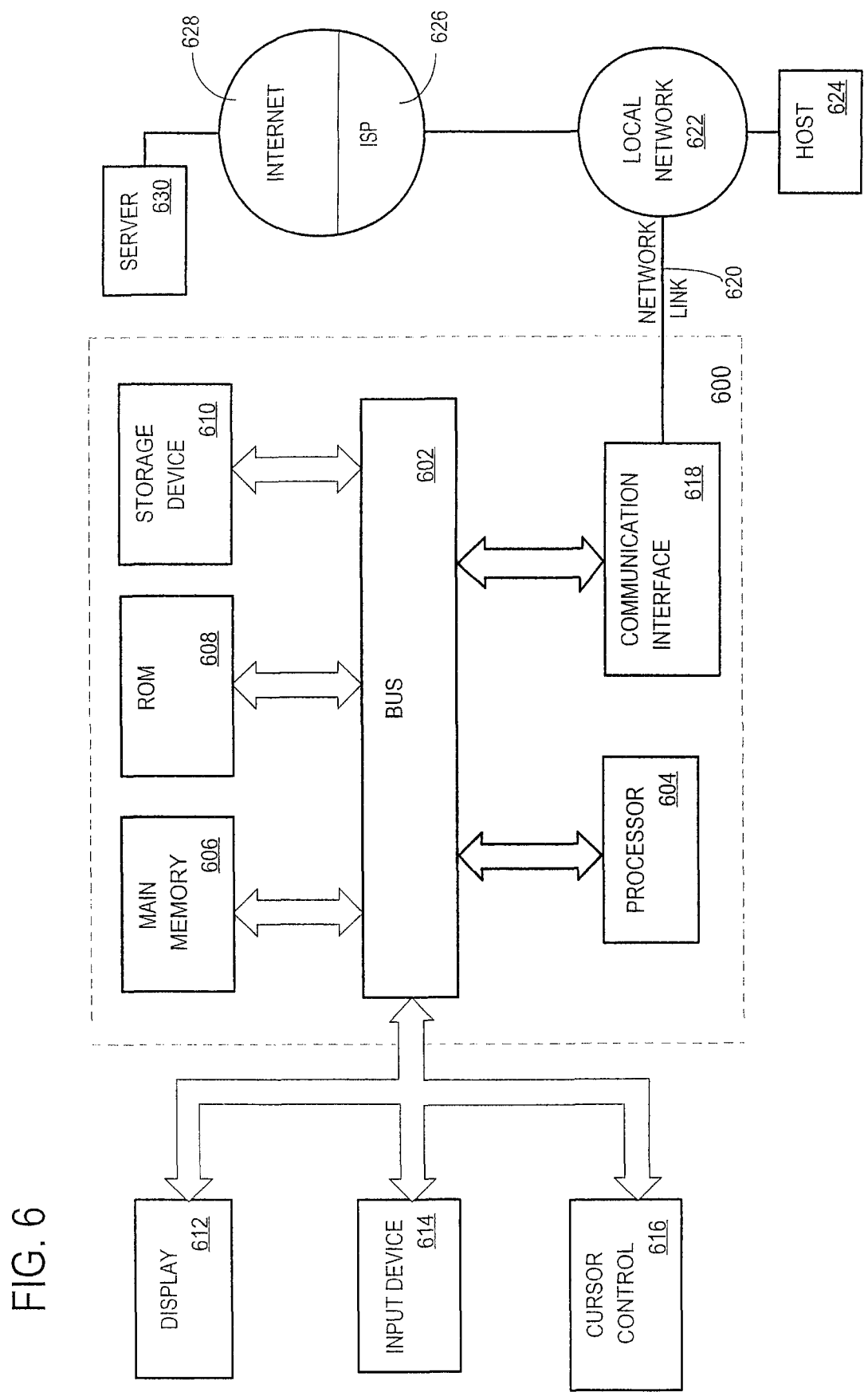
FIG. 6 is block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, by a server system executing on a third-party domain, from a client computing device, a request for a tracking document, the client computing device having been instructed to load the tracking document by a tracking document container within a first document, the first document being from a first domain that is different from the third-party domain;
   responsive to the request, sending, from the server system executing on the third-party domain, to the client computing device, the tracking document, the tracking document comprising a web page that includes one or more instructions that, when executed by the client computing device, cause a browser at the client computing device to:
      load a client-specific identifier from a data store allocated for the third-party domain;
      send the client-specific identifier to the server system in one or more messages indicating one or more events that have occurred in association with the first document;
   receiving, from the client computing device, the client-specific identifier in the one or more messages indicating the one or more events that have occurred with respect to the first document at the client computing device;
   responsive to the one or more messages, storing tracking information reflecting that the one or more events occurred in association with the client-specific identifier.

2. The method of claim 1, further comprising providing, to the client computing device, one or more instructions that cause the client computing device to insert the tracking document container into the first document.

3. The method of claim 1, further comprising:
   receiving a request from the client computing device to select an item of supplemental content for display at the client computing device;
   locating the client-specific identifier based on information in the request;
   selecting the item of supplemental content based on the tracking information stored in association with the client-specific identifier.

4. The method of claim 1, further comprising:
   receiving a request from the client computing device to select an item of supplemental content for display at the client computing device;
   locating the client-specific identifier based on information in the request;
   selecting the item of supplemental content based on the tracking information stored in association with the client-specific identifier;
   sending to the client computing device one or more instructions that, when executed by the client computing device, cause the client computing device to insert the selected item of supplemental content into the first document;
   wherein the one or more messages include the request to select the item of supplemental content, and the tracking information indicates at least which item of supplemental content was selected.

5. The method of claim 1, wherein the one or more events include user input at the client computing device selecting a specified element within the first document.

6. The method of claim 1, wherein the one or more instructions, when executed by the client computing device, further cause the client computing device to provide the client-specific identifier from identifier loading instructions associated with the tracking document to event tracking instructions associated with the first document.

7. The method of claim 1, wherein the one or more instructions, when executed by the client computing device, further cause the client computing device to listen for event tracking messages provided by event tracking instructions associated with the first document, and, responsive to the event tracking messages, send the one or more messages with the client-specific identifier to the server system.

8. The method of claim 1, wherein the data store allocated for the third-party domain is inaccessible to the client computing device when executing instructions associated with documents that do not belong to the third-party domain.

9. The method of claim 1, wherein the one or more instructions further cause the client computing device to:
   send the client-specific identifier to the server system in a second set of one or more messages indicating a second set of one or more events that are associated with a second document, the second document being from a second domain that is different from the first domain and the third-party domain;
   the method further comprising:
      receiving, from the client computing device, the client-specific identifier in the second set of one or more messages indicating that the second set of one or more events have occurred with respect to the second document at the client computing device;
      responsive to the second set of one or more messages, updating the tracking information to reflect that the second set of one or more events has occurred in association with the client-specific identifier.

10. The method of claim 1, wherein the data store allocated for the third-party domain is an HTML5 Web Storage area or an IndexedDB database.

11. A system comprising:
content server systems comprising one or more server computing devices, having at least a processor and memory, configured to provide content documents to client computing devices, the content server systems belonging to two or more different content provider domains;
client computing devices, having at least a processor and memory, configured to display the content documents and execute instructions associated with the content documents, the instructions including one or more instructions to load a tracking document within tracking document containers that have been inserted into the content documents, the tracking document comprising a web page;
a third-party server system belonging to a third-party domain that is different from the two or more content provider domains, the third-party server system comprising one or more server computing devices configured to:
send the tracking document to the client computing devices responsive to the client computing devices requesting the tracking document for loading in the tracking document containers;
receive messages indicating specific events that have occurred with respect to specific documents, of the content documents, at specific clients of the client computing devices, the messages including client-specific identifiers loaded by the client computing devices in response to one or more instructions in the tracking document;
store, in association with the client-specific identifiers, tracking information reflecting the specific events indicated by the messages.

12. The system of claim 11, wherein the tracking information includes, for a particular client of the client computing devices, a first event log entry reflecting an occurrence of a first event with respect to a first document belonging to a first content provider domain, and a second event log entry reflecting an occurrence of a second event with respect to a second document belonging to a second content provider domain, the first content provider domain being different from the second content provider domain.

13. One or more non-transitory computer-readable media storing instructions that, when executed by one or more computing devices, cause performance of:
inserting, within a first document that is being presented by a browser at a client computing device, a tracking document container, the tracking document container instructing the browser to request a tracking document from a server system executing on a third-party domain, the first document being from a first domain that is different from the third-party domain;
loading, by the browser at the client computing device, from the server system executing on the third-party domain, the tracking document within the tracking document container of the first document, the tracking document comprising a web page;
based on instructions associated with the tracking document, loading a client-specific identifier from a data store allocated for the third-party domain;
sending the client-specific identifier to a tracking server in one or more messages indicating one or more events that have occurred in association with the first document.

14. The one or more non-transitory computer-readable media of claim 13, wherein the instructions, when executed by the one or more computing devices, further cause:
sending a request from the client computing device to a supplemental item server to select an item of supplemental content for display at the client computing device;
wherein the supplemental item server is configured to select the item of supplemental content based on tracking information stored by the tracking server in association with the client-specific identifier;
inserting the supplemental item in the first document.

15. The one or more non-transitory computer-readable media of claim 13, wherein the one or more events include user input at the client computing device selecting a specified element within the first document.

16. The one or more non-transitory computer-readable media of claim 13, wherein the one or more instructions, when executed by the one or more computing devices, further cause the client computing device to provide the client-specific identifier from identifier loading instructions associated with the tracking document to event tracking instructions associated with the first document.

17. The one or more non-transitory computer-readable media of claim 13, wherein the one or more instructions, when executed by the one or more computing devices, further cause the client computing device to listen for event tracking messages provided by event tracking instructions associated with the first document, and, responsive to the event tracking messages, send the one or more messages with the client-specific identifier to the tracking server.

18. The one or more non-transitory computer-readable media of claim 13, wherein the data store allocated for the third-party domain is inaccessible to the client computing device when executing instructions associated with documents that do not belong to the third-party domain.

19. The one or more non-transitory computer-readable media of claim 13, wherein the one or more instructions further cause:
the client computing device sending the client-specific identifier to the tracking server in a second set of one or more messages indicating a second set of one or more events that are associated with a second document, the second document being from a second domain that is different from the first domain and the third-party domain.

20. The one or more non-transitory computer-readable media of claim 13, wherein the data store allocated for the third-party domain is an HTML5 Web Storage area or an IndexedDB database.

* * * * *